(12) United States Patent
Liu et al.

(10) Patent No.: US 8,612,453 B2
(45) Date of Patent: *Dec. 17, 2013

(54) TOPIC DISTILLATION VIA SUBSITE RETRIEVAL

(75) Inventors: Tie-Yan Liu, Beijing (CN); Tao Qin, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/505,436

(22) Filed: Jul. 17, 2009

(65) Prior Publication Data
US 2009/0282032 A1     Nov. 12, 2009

Related U.S. Application Data

(63) Continuation of application No. 11/375,612, filed on Mar. 13, 2006, now Pat. No. 7,580,931.

(51) Int. Cl.
    *G06F 7/00*     (2006.01)
(52) U.S. Cl.
    USPC .......................................................... 707/748
(58) Field of Classification Search
    USPC .......................................... 707/999.006, 748
    See application file for complete search history.

(56) References Cited

U.S. PATENT DOCUMENTS

| | | | |
|---|---|---|---|
| 5,940,821 A | 8/1999 | Wical | |
| 6,363,378 B1 | 3/2002 | Conklin et al. | |
| 6,738,678 B1 | 5/2004 | Bharat et al. | |
| 6,871,202 B2 | 3/2005 | Broder | |
| 7,028,029 B2 | 4/2006 | Kamvar et al. | |
| 7,580,931 B2 | 8/2009 | Liu et al. | |
| 7,634,476 B2 | 12/2009 | Liu et al. | |
| 2003/0037074 A1 | 2/2003 | Dwork et al. | |
| 2003/0204502 A1 | 10/2003 | Tomlin et al. | |
| 2004/0064438 A1 | 4/2004 | Kostoff | |
| 2004/0267722 A1 | 12/2004 | Larimore et al. | |
| 2005/0060297 A1 | 3/2005 | Najork | |
| 2005/0071465 A1 | 3/2005 | Zeng et al. | |
| 2005/0165766 A1 | 7/2005 | Szabo | |
| 2005/0256860 A1 | 11/2005 | Eiron et al. | |

(Continued)

FOREIGN PATENT DOCUMENTS

EP     1653380     5/2006

OTHER PUBLICATIONS

Xue et al., "Exploiting the Hierarchical Structure for Link Analysis," ACM SIGIR Conference on Research and Development in Information Retrieval, pp. 186-193, Aug. 15, 2005.*

(Continued)

*Primary Examiner* — Jensen Hu
(74) *Attorney, Agent, or Firm* — Perkins Coie LLP

(57) ABSTRACT

A method and system for generating a search result for a query of hierarchically organized documents based on retrieval of subtrees that are key resources for topic distillation is provided. The retrieval system may identify documents relevant to a query using conventional searching techniques. The retrieval system then calculates a subtree feature for subtrees that have an identified document as their root. After the retrieval system calculates the subtree feature for the subtrees, the retrieval system may generate a subtree relevance score for each subtree based on its subtree feature. The retrieval system may then order the identified documents based on their corresponding subtree relevances.

20 Claims, 7 Drawing Sheets

(56) References Cited

U.S. PATENT DOCUMENTS

| | | |
|---|---|---|
| 2006/0004809 A1 | 1/2006 | Zhang et al. |
| 2006/0095416 A1 | 5/2006 | Barkhin et al. |
| 2006/0179046 A1 | 8/2006 | Rajaraman et al. |
| 2006/0184527 A1 | 8/2006 | Chi et al. |
| 2007/0156677 A1 | 7/2007 | Szabo |

OTHER PUBLICATIONS

Candan et al., Discovering Web Document Associations for Web Site Summarization, 2001.*
Kwon, Hierarchical Categorization Based on k-Nearest Neighbor Approach for Web Site Classification, International Journal of Computer Processing of Oriental Languages, vol. 16 No. 1 pp. 63-85 (published 2003).*
U.S. Appl. No. 11/293,044, Bragdon.
U.S. Appl. No. 11/459,869, Liu et al.
Albert, Reka and Albert-Laszlo Barabasi, "Statistical mechanics of complex networks," Reviews of Modern Physics, vol. 74, Jan. 2002, © 2002 The American Physical Society, pp. 47-97.
Amitay, Einat, et al., "Topic Distillation with Knowledge Agents," 11th TREC, 2002, 10 pages.
Arasu, Arvind et al., "PageRank Computation and the Structure of the Web: Experiments and Algorithms," Technical Report, IBM Almaden Research Center, Nov. 2001, 5 pages.
Baeza-Yates, R. and B. Ribeiro-Neto, "Chapter 2 Modeling and Chapter 3 Retrieval Evaluation," Modern Information Retrieval, © 1999 by the ACM Press, pp. 19-97.
Bharat, Krishna and George A. Mihaila, "When Experts Agree: Using Non-Affiliated Experts to Rank Popular Topics," WWW10, Hong Kong, pp. 597-602.
Bharat, Krishna and Monika R. Henzinger, "Improved Algorithms for Topic Distillation in a Hyperlinked Environment," SIGIR'98, Melbourne, Australia, ACM 1998, 9 pages.
Bharat, Krishna et al., "Who Links to Whom: Mining Linkage between Web Sites," In Proceedings of the IEEE International Conference on Data Mining (ICDM'01), San Jose, California, Nov. 2001, 8 pages.
Broder, Andrei, "A taxonomy of web search," SIGIR Forum 36(2), 2002, 8 pages.
Chakrabarti, Soumen, "Integrating the Document Object Model with Hyperlinks for Enhanced Topic Distillation and Information Extraction," WWW10, May 2001, Hong Kong, pp. 211-220.
Chakrabarti, Soumen, Mukul Joshi and Vivek Tawde, "Enhanced Topic Distillation using Text, Markup Tags, and Hyperlinks," SIGIR'01, New Orleans, Louisiana, ACM 2001, 9 pages.
Cho, Grace E. and Carl D. Meyer, "Aggregation /Disaggregation Methods of Nearly Uncoupled Markov Chains," Nov. 24, 1999, Department of Mathematics, North Carolina State University, 12 pages.
Craswell, Nick and David Hawking, "Overview of the TREC 2003 Web Track," 12th TREC 2003, Mar. 22, 2004, pp. 1-15.
Davulcu, Hasan et al., "OntoMiner: Bootstrapping Ontologies From Overlapping Domain Specific Web sites," WWW2004, May 2004, New York, ACM, 2 pages.
Despeyroux, Thierry, "Practical Semantic Analysis of Web Sites and Documents," WWW2004, May 2004, New York, ACM, pp. 685-693.
Dill, Stephen et al., "Self-Similarity In the Web," ACM Transactions on Internet Technology, vol. 2, No. 3, Aug. 2002, © 2002 ACM, pp. 205-223.
Dwork, Cynthia et al., "Rank Aggregation Methods for the Web," WWW10, May 2001, Hong Kong, ACM, pp. 613-622.
Eiron, Nadav et al., "Ranking the Web Frontier," WWW2004, May 2004, New York, ACM, pp. 309-318.
Girvan, Michelle and M. E. J. Newman, "Community structure in social and biological networks," Dec. 7, 2001, Proc. Natl. Acad. Sci. USA, 2002, pp. 7821-7826.
Google, http://www.google.com, 1 page, [last accessed Jan. 26, 2007].
Hawking, David, "Overview of the TREC-9 Web Track," 9th TREC, 2000, Sep. 4, 2001, pp. 1-16.
Henzinger, Monika R. et al., "Challenges in Web Search Engines," Sep. 3, 2002, In Proceedings of the 18th International Joint Conference on Artificial Intelligence, 2003, 12 pages.
Kamvar, Sepandar D. et al., "Extrapolation Methods for Accelerating PageRank Computations," WWW2003, May, Budapest, Hungary, ACM, 10 pages.
Kamvar, Sepandar, D. et al., "Exploiting the Block Structure of the Web for Computing PageRank," Stanford University Technical Report, Copyright 2003, 13 pages.
Kleinberg, Jon M., "Authoritative Sources in a Hyperlinked Environment," Journal of the ACM, vol. 46, No. 5, 1999, 34 pages.
Langville, Amy N. and Carl D. Meyer, "Deeper Inside PageRank," Jul. 6, 2004, Internet Mathematics, vol. 1, No. 3, © A K Peters, Ltd., pp. 335-380.
Lei, Yuangui et al., "Modelling Data-Intensive Web Sites with OntoWeaver," In Proceedings of International Workshop on Web Information Systems Modeling, Riga, Latvia, Jun. 2004, 16 pages.
Lerman, Kristina et al., "Using the Structure of Web Sites for Automatic Segmentation of Tables," SIGMOD 2004, Paris, France, © 2004 ACM, 12 pages.
Meghabghab, George, "Google's Web Page Ranking Applied to Different Topological Web Graph Structures," Jan. 2, 2001, Journal of the American Society for Information Science and Technology, 52(9), Jul. 2001, © 2001 by John Wiley & Sons, Inc., pp. 736-747.
Meyer, C. D., "Stochastic Complementation, Uncoupling Markov Chains, and the Theory of Nearly Reducible Systems," Feb. 2, 1989, SIAM Review, 31 (1989), 34 pages.
NetCraft, http://www.netcraft.com, 6 pages, [last accessed Jan. 26, 2007].
Page, L., S. Brin, R. Motwani and T. Winograd, "The PageRank Citation Ranking: Bringing Order to the Web," Jan. 29, 1998, Stanford University Technical Report, 17 pages.
Qin, Tao et al., "Subsite Retrieval: A Novel Concept for Topic Distillation," G.G. Lee et al. (Eds.), AIRS 2005, LNCS 3689, 2005, © Springer-Verlag Berlin Heidelberg 2005, pp. 388-400.
ResearchBuzz!, "Google Celebrates 7, Where Did the 8 Go?," Sep. 27, 2005, http://www.researchbuzz.org/2005/09/google_celebrates_7_where_did.shtml.
Robertson, S.E. and K. Sparck Jones, "Relevance Weighting of Search Terms," Journal of the American Society for Information Science, vol. 27, No. 3, May-Jun. 1976, pp. 129-146.
Robertson, S.E., "Overview of the Okapi Projects," Journal of Documentation, vol. 53, No. 1, Jan. 1997, pp. 3-7.
Shakery, Azadeh and ChengXiang Zhai, "Relevance Propagation for Topic Distillation UIUC TREC-2003 Web Track Experiments," 12th TREC, 2003, pp. 1-5.
Stewart, William J., "Chapter 6.2—Stochastic Complementation," Introduction to the Numerical Solution of Markov Chains, copyright 1994 by Princeton University Press, pp. 294-307.
TREC-2004 Web Track Guidelines, Updated Jul. 16, 2004 (7 pages).
Wang, Jidong et al., "ReCoM: Reinforcement Clustering of Multi-Type Interrelated Data Objects," SIGIR'03, Toronto, Canada, © 2003 ACM, 8 pages.
Wang, Yuan and David J. DeWitt, "Computing PageRank in a Distributed Internet Search System," Proceedings of the 30th VLDB Conference, Toronto, Canada, 2004, pp. 420-431.
Wu, Jie and Karl Aberer, "Using SiteRank for Decentralized Computation of Web Document Ranking," AH 2004, LNCS 3137, 2004, © Springer-Verlag Berlin Heidelberg 2004, pp. 265-274.
Wu, Jie and Karl Aberer, "Using SiteRank for P2P Web Retrieval," Mar. 24, 2004, EPFL Technical Report ID: IC/2004/31, 20 pages.
Yu, Shipeng et al., "Improving Pseudo-Relevance Feedback in Web Information Retrieval Using Web Page Segmentation," WWW2003, May 2003, Budapest, Hungary, ACM, 11 pages.

* cited by examiner

TOPIC DISTILLATION VIA SUBSITE RETRIEVAL

CROSS REFERENCE TO RELATED APPLICATION

The present application is a Continuation of U.S. patent application Ser. No. 11/375,612, filed Mar. 13, 2006, and entitled "TOPIC DISTILLATION VIA SUBSITE RETRIEVAL," which is incorporated herein in its entirety by reference.

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on various metrics such as the term frequency by inverse document frequency metric ("tf*idf"). The search engine service may also generate an importance score to indicate the importance of the web page based on various metrics such as Google's PageRank metric. The search engine service then displays to the user links to those web pages in an order that is based on a ranking determined by their relevance and importance.

Two well-known techniques for determining the importance of web pages are PageRank and HITS ("Hyperlink-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q)$$

and $$h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

Although these techniques are useful for locating a broad range of documents that are relevant to a query, these techniques often do not provide satisfactory results for a "topic distillation." Topic distillation refers to the finding of key resources for a particular topic. Some surveys have indicated that in 30%-40% of web searches the user is interested in finding key web pages for the topic of the query. Although a search engine may return a broad range of documents that include key documents, those key documents may be buried deep within the thousands of documents of the search result. For example, a person who submits the query "wireless communication" may want to identify a key web page for this topic. A typical search engine that bases relevance on the content of each web page may include the web pages of Table 1 in the search result.

TABLE 1

| Rank | Document ID | Relevance | URL |
| --- | --- | --- | --- |
| 70 | G35-97-1056561 | 9.858 | cio.doe.gov/wireless/3g/3g__index.htm |
| 470 | G07-38-3990160 | 9.508 | cio.doe.gov/spectrum/groups.htm |
| 477 | G35-75-1119753 | 9.481 | cio.doe.gov/spectrum/philo.htm |
| 518 | G36-35-1278614 | 9.320 | cio.doe.gov/wireless/background.htm |
| 571 | G07-10-2999356 | 9.093 | cio.doe.gov/spectrum/background.htm |
| 648 | G35-01-1537522 | 8.817 | cio.doe.gov/wireless/wwg/wwg__index.htm |
| 649 | G07-78-3824915 | 8.815 | cio.doe.gov/wireless/ |

Table 1 lists web pages of the search result that are within the subsites "cio.doe.gov/wireless" and "cio.doe.gov/spectrum." Since the user is interested in key web pages relating to wireless communication, the web page identified with the URL "cio.doe.gov/wireless" is likely more of a key resource to the topic of "wireless communication" than the other web pages listed in Table 1. However, because the relevance to the query may be based on the similarity of the content of the web pages to the query, many web pages that are not key resources for topic distillation have a higher relevance score and thus a higher ranking. In such a case, it can be difficult for a user to search through the pages of search results to identify key resources to the topic of interest.

SUMMARY

A method and system for generating a search result for a query of hierarchically organized documents based on retrieval of subtrees that are key resources for topic distillation is provided. The retrieval system may identify documents relevant to a query using conventional searching techniques. The retrieval system then calculates a subtree feature for subtrees that have an identified document as their root. The subtree feature is a combination of a contribution of that feature derived from the root document along with a contribution of that feature derived from the descendant documents of that root document. After the retrieval system calculates the subtree feature for the subtrees, the retrieval system may generate a subtree relevance score for each subtree based on its subtree feature. The retrieval system may then order the identified documents based on their corresponding subtree relevances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
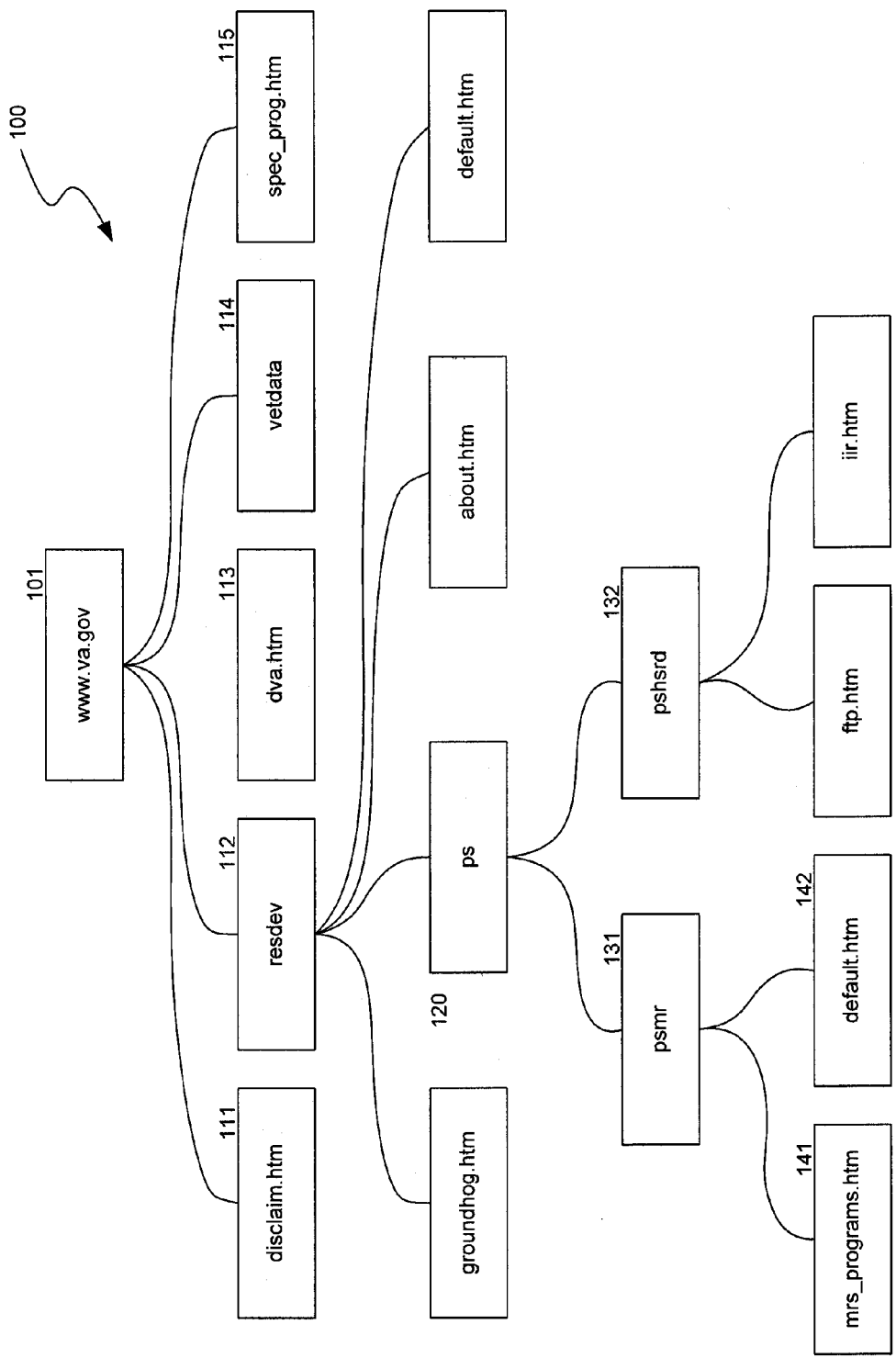
FIG. 1 is a diagram that illustrates the hierarchical relations of web pages of a sample web site.

A method and system for generating a search result for a query of hierarchically organized documents based on retrieval of subtrees that are key resources for topic distillation is provided. In one embodiment, the retrieval system identifies documents relevant to a query using conventional searching techniques. For example, the retrieval system may input a query, submit the query to a search engine service, and receive the search result from the search engine service. The retrieval system then calculates a subtree feature for subtrees that have an identified document as its root. The subtree feature is a combination of a contribution of that feature derived from the root document along with a contribution of that feature derived from the descendant documents of that root document. For example, the feature may be a term frequency by inverse document frequency metric or any other feature or combination of features that can be used to determine relevance of a document to a query. After the retrieval system calculates the subtree feature for the subtrees, the retrieval system may generate a subtree relevance score for each subtree based on its subtree feature. Since the subtree relevance score is generated from features aggregated from both the root document and its descendant documents, the subtree relevance score provides a more accurate representation of the relevance of the root document to the query for purposes of topic distillation. The retrieval system may then order the identified documents based on their corresponding subtree relevances. The retrieval system may also assess the subtree relevance of ancestor documents of the identified documents. The retrieval system may calculate the subtree relevance for the parent document, the grandparent document, and so forth. The retrieval system may then select the ancestor document (one may consider a document to be its own ancestor) with the highest subtree relevance for inclusion in the search result. In this way, the retrieval system provides search results that identify subtrees of documents that represent key resources of the query topic, rather than results that identify individual documents whose content is more relevant to a query than the content of other documents.

In one embodiment, the retrieval system interfaces with a web-based search engine to identify subsites (i.e., a portion of a web site) of web pages that are key sources of information for a query topic. The retrieval system considers each web page of the search result to be a root web page of a subsite. The retrieval system calculates a subsite feature by combining a contribution of the feature of the root web page and a contribution of the feature derived from the descendant web pages.

When calculating the contribution of the descendant web pages, the retrieval system weights the contribution of descendants with a close ancestral distance more highly than the contribution of descendants with a distant ancestral distance. For example, the contribution of a feature derived from child web pages of a root web page will have a greater effect on the subsite feature than the contribution derived from great-grandchildren web pages. In addition, the retrieval system weights the contribution of descendants that have fewer siblings more highly then the contribution of descendants with more siblings. For example, the contribution of a feature derived from a child web page with only one sibling will have a greater effect on the subsite feature than the contribution derived from a child web page with 10 siblings. In this way, the retrieval system factors in both ancestral distance and number of siblings in determining contribution of a web page to a subsite feature.

In one embodiment, the retrieval system uses an ancestral distance punishment factor when determining the contribution of a web page. The ancestral distance punishment factor may help prevent "concept drift" that results from more and more levels of web pages being added to a subsite. The retrieval system may represent the ancestral distance punishment factor as follows:

$$\alpha(\Delta l) = \lambda^{\Delta l} \quad (1)$$

where $\alpha$ represents an ancestral distance punishment factor, $\Delta l$ represents an ancestral distance between a root web page and a descendant web page, and $\lambda$ represents a control parameter to control the amount of punishment. The ancestral distance is the number of levels from a web page to a descendant web page. The level l of a web page of a web site corresponds to its depth within the subsite. The root web page of a subsite has a level of 1, its children web pages have a level of 2, their children's web pages have a level of 3, and so on. Thus, the ancestral distance between web pages is represented as follows:

$$\Delta l = l(a) - l(b) \quad (2)$$

where l(x) represents the level of web page x, and a and b represent web page a and its descendant web page b. By adjusting the control parameter, the retrieval system can affect the contribution of ancestor web pages to a subsite feature. For example, if the control parameter is set to ½, then the punishment factor for child web pages will be ½, for grandchild web pages will be ¼, for great-grandchild web pages will be ⅛, and so on. By increasing the control parameter, the effect of more ancestrally distant web pages will increase, and vice versa.

In one embodiment, the retrieval system uses a sibling punishment factor when determining the contribution of a descendant web page. The sibling punishment factor may help prevent the contribution resulting from a large number of sibling web pages at a certain level from overwhelming the contribution of the root web page of the subsite. If a web page has 10 child web pages, then even though the contribution from each child web page is punished by the ancestral distance punishment factor, the overall contribution from so many child web pages may be large. The retrieval system decreases the contribution of a web page as its number of sibling web pages increases. The retrieval system may represent the sibling punishment factor as follows:

$$\frac{1}{\|R(p_s)\|} \sum_{u=1}^{h(p_s)-1} \left[ \sum_{p_{i_1} \in R(p_s)} \sum_{p_{i_2} \in R(p_{i_1})} \cdots \sum_{p_{i_u} \in R(p_{i_{u-1}})} \frac{f(p_{i_u})}{\prod_{k=1}^{u} \|R(p_{i_k})\|} \right] \quad (3)$$

where $h(p_s)$ represents height of the subsite with $p_s$ as the root web page, $R(p_s)$ represents the child web pages of $p_s$, $\|a\|$ represents the number of elements of a, and $f(p_{i_u})$ represents the feature of web page $P_{i_u}$. As indicated by Equation 3, the retrieval system sums the contribution of each descendant web page punished by the product of the number of siblings at each higher level in the subsite. For example, the contribution of a web page at level 3 with 5 siblings with a parent web page at level 2 with 4 siblings is 1/20 (i.e., 1/(4*5)). The retrieval system may further punish the resulting contribution by the number of child web pages.

In one embodiment, the retrieval system may combine the ancestral distance punishment factor and the sibling punishment factor when calculating the contribution of the descendant web pages. In addition, the retrieval system may add the contribution of the descendant web pages derived using the combined punishment factor to the contribution of the root web page according to the following:

$$F[S(p_s)] = \alpha(0) f(p_s) + \frac{1}{\|R(p_s)\|} \quad (4)$$

$$\sum_{u=1}^{h(p_s)-1} \left[ \alpha(u) \sum_{p_{i_1} \in R(p_s)} \sum_{p_{i_2} \in R(p_{i_1})} \cdots \sum_{p_{i_u} \in R(p_{i_{u-1}})} \frac{f(p_{i_u})}{\prod_{k=1}^{u} \|R(p_{i_k})\|} \right]$$

where $F[S(p_s)]$ represents the feature of the subsite with root web page $p_s$. In one embodiment, the retrieval system may use a conventional metric for generating the feature of a web page. The feature of a web page may include term frequency, keyword frequency, title, image size, and so on. More generally, a feature may be represented as a feature vector describing various characteristics of a web page. The retrieval system may generate subsite features for all subsites of a web site.

The retrieval system may calculate the subsite feature for a subsite using a variety of techniques. For example, the retrieval system may adapt the propagation-based algorithm described in U.S. patent application Ser. No. 11/273,715, entitled "Hierarchy-Based Propagation of Contribution of Documents" and filed on Nov. 14, 2005, which is hereby incorporated by reference. When using that propagation-based algorithm, the retrieval system may initially generate the feature for the web pages without descendant web pages (i.e., leaf web pages). The retrieval system then propagates the feature of these web pages to their parent web pages and to their parent web pages up the hierarchy of web pages. The retrieval system may generate the feature of each ancestor web page from the web page itself and then factor in the feature of its descendant web pages to provide an overall feature for the ancestor web page. The retrieval system may generate the feature of a web page according to the following equation:

$$g(F(p), \text{Child}(p)) = \begin{cases} F(p), & \text{Child}(p) = \phi \\ (1+\alpha)F(p) + \\ \alpha \dfrac{\sum_{q \in \text{RelChild}(p)} g(F(p), \text{Child}(p))}{|\text{RelChild}(p)|}, & \text{RelChild}(p) \neq \phi \\ (1+\alpha)F(p), & \text{Child}(p) \neq \phi \\ & \text{and } \text{RelChild}(p) = \phi \end{cases} \quad (5)$$

where g(F(p),Child(p)) represents the feature of web page p, F(p) represents a function for generating the feature for web page p, Child(p) represents the child web pages of p, φ represents the empty set, RelChild(p) represents the child web pages of p that are related to the feature, || represents the number of web pages in a set, and a represents the weight between the feature derived from the web page itself and the feature of the descendant web pages.

FIG. 1 is a diagram that illustrates the hierarchical relations of web pages of a sample web site. The web site 100 has a root web page 101 identified by the URL "www.va.gov." Web page 101 has child web pages 111-115, with URLs "www.va.gov/disclaim.htm," "www.va.gov/resdev," "www.va.gov/dva.htm," "www.va.gov/vetdata," and "www.va.gov/spec_prog.htm." In this example, the depth of the URL indicates the hierarchical relations of the web pages. For example, web page 120 is a child of web page 112 and has the URL "www.va.gov/resdev/ps." Web page 120 has child web pages 131 and 132 with URLs "www.va.gov/resdev/ps/psmr" and "www.va.gov/resdev/ps/pshrd." Web page 131 has child web pages 141 and 142 with URLs "www.va.gov/resdev/ps/psmr/mrs_programs.htm" and "www.va.gov/resdev/ps/psmr/default.htm." In this example, web page 101 is an ancestor web page common to all the other web pages, and web page 141 is a descendant web page of web pages 131, 120, 112, and 101. Any web page of the website can be considered a root web page of a subsite. For example, web page 131 is a root web page of a subsite that includes web pages 131, 141, and 142. One skilled in the art will appreciate that various techniques may be used to identify the hierarchical relations or structure of documents and in particular web sites. For example, the hierarchical structure of a web site may be derived from a site map included as a web page of the web site or may be derived from the intra-site links between web pages.

Figure 2:
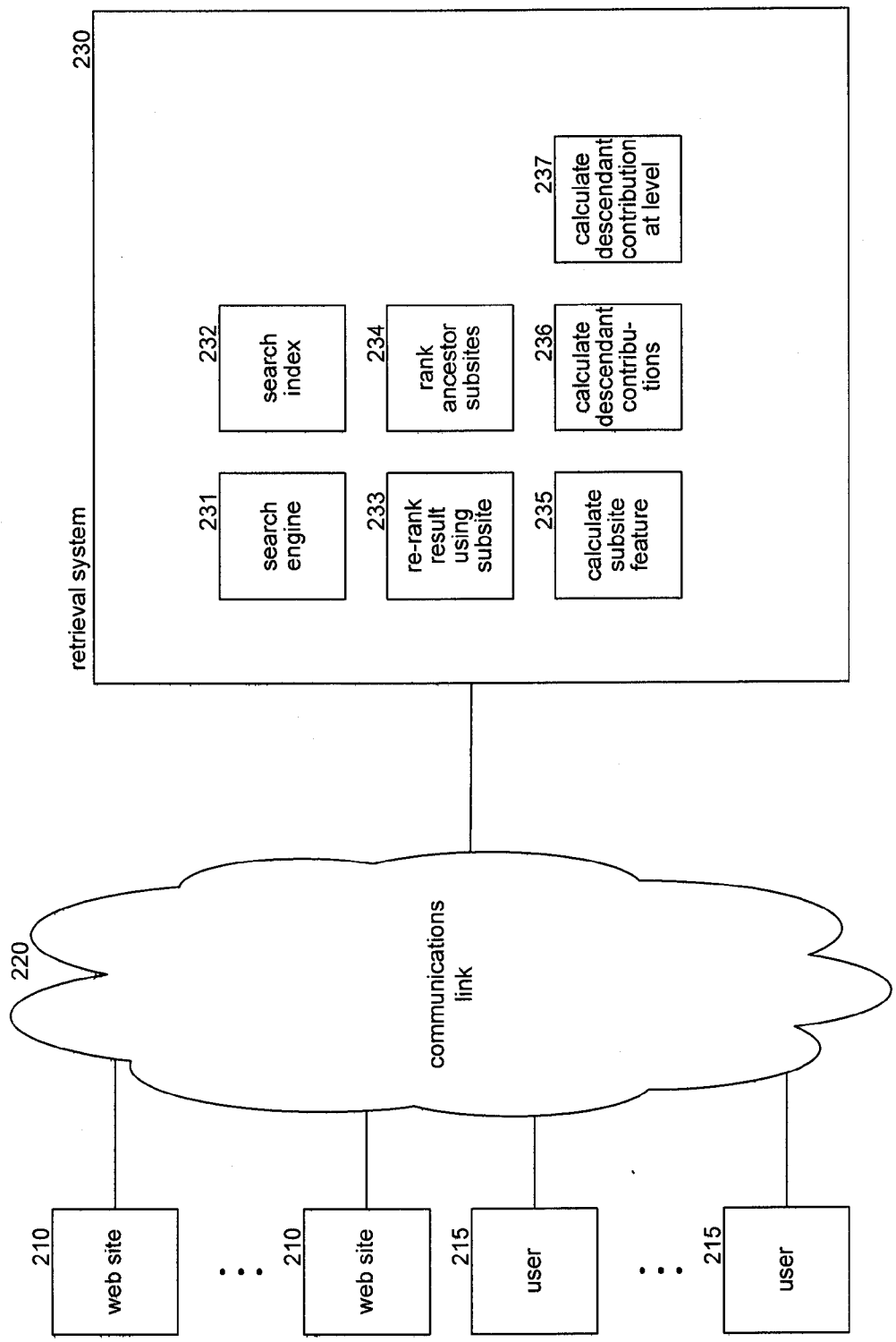
FIG. 2 is a block diagram that illustrates components of the retrieval system in one embodiment.

FIG. 2 is a block diagram that illustrates components of the retrieval system in one embodiment. The retrieval system 230 is connected to web sites 210 and user computing devices 215 via communications link 220. The retrieval system includes a search engine component 231 and a search index store 232. The search engine component receives queries from user computing devices and identifies search results based on the search index store. The search index store may contain a mapping of keywords to web sites as generated by a web crawler. The retrieval system also includes a re-rank result using subsite component 233, a rank ancestor subsites component 234, a calculate subsite feature component 235, a calculate descendant contributions component 236, and a calculate descendant contributions at level component 237. The re-rank result using subsite component is invoked by the search engine component to re-rank search results factoring in subsite features derived from subsites that have a web page of the search result as their root web page. The re-rank result using subsite component invokes the calculate subsite feature component for each web page of the search result. The calculate subsite feature component invokes the calculate descendant contributions component to calculate the contribution of descendant web pages to the subsite feature. The calculate subsite feature component then combines the feature of the root web page with the contribution of the descendant web pages to generate the subsite feature. The calculate descendant contributions component invokes the calculate descendant contributions at level component for each level within the subsite to calculate the contribution of the web pages at that level to the subsite feature.

The computing device on which the retrieval system is implemented may include a central processing unit, memory, input devices (e.g., keyboard and pointing devices), output devices (e.g., display devices), and storage devices (e.g., disk drives). The memory and storage devices are computer-readable media that may contain instructions that implement the retrieval system. In addition, the data structures and message structures may be stored or transmitted via a data transmission medium, such as a signal on a communications link. Various communications links may be used, such as the Internet, a local area network, a wide area network, or a point-to-point dial-up connection.

The retrieval system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The retrieval system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
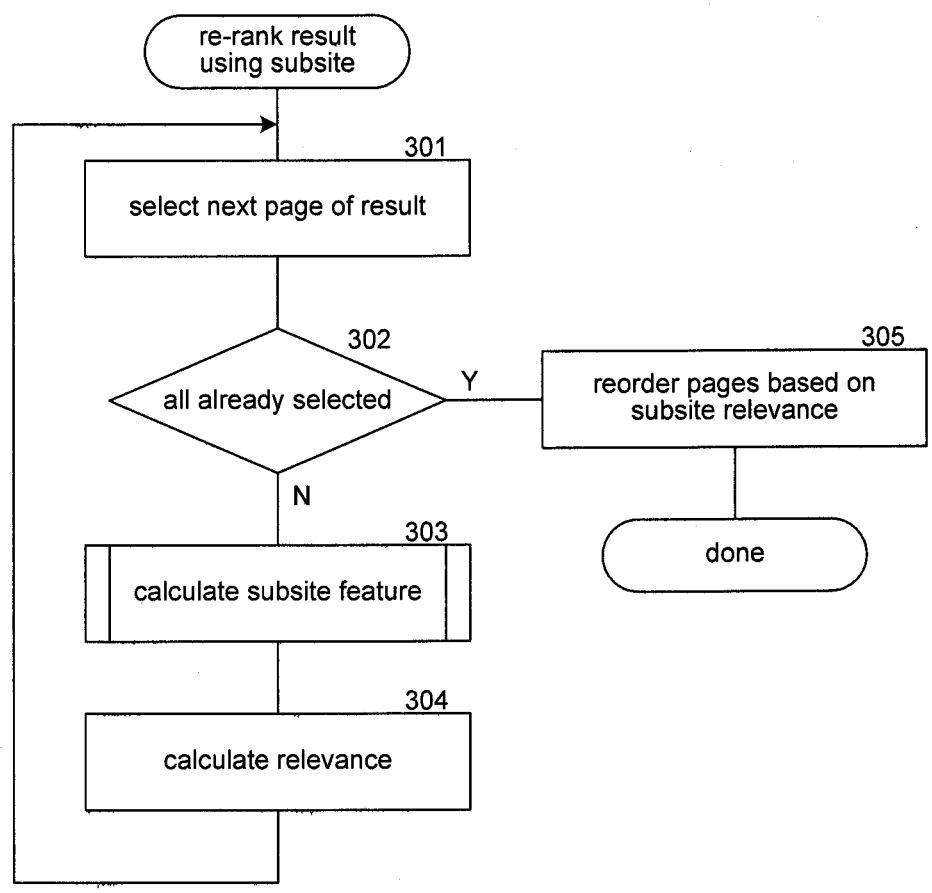
FIG. 3 is a flow diagram that illustrates the processing of the re-rank result using subsite component of the retrieval system in one embodiment.

FIG. 3 is a flow diagram that illustrates the processing of the re-rank result using subsite component of the retrieval system in one embodiment. The component loops calculating a subsite feature for each subsite that has a web page of the search result as its root. In block 301, the component selects the next web page of the search result. In decision block 302, if all the web pages have already been selected, then the component continues at block 305, else the component continues at block 303. In block 303, the component invokes the calculate subsite feature component to calculate the subsite feature for the selected web page. In block 304, the component calculates a relevance for the subsite of the selected web page. The component may calculate the relevance using a term frequency by inverse document frequency metric. The component then loops to block 301 to select the next web page of the result. In block 305, the component reorders the web pages based on the subsite relevance associated with each web page. The component then completes.

Figure 4:
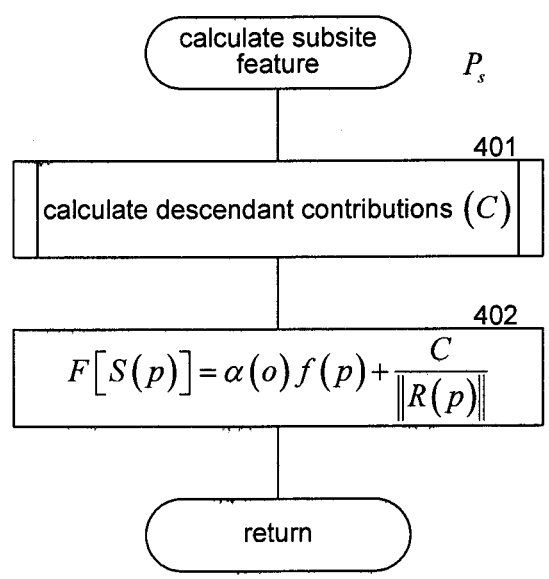
FIG. 4 is a flow diagram that illustrates the processing of the calculate subsite feature component of the retrieval system in one embodiment.

FIG. 4 is a flow diagram that illustrates the processing of the calculate subsite feature component of the retrieval system in one embodiment. The component combines the contribution of the passed web page with the contribution of its descendant web pages to generate an overall subsite feature for the subsite with the passed web page as its root. In block 401, the component invokes the calculate descendant contributions component passing the root web page and receiving the contribution in return. In block 402, the component combines the contribution of the root web page to the contribution of the descendant web pages according to Equation 4 and then returns.

Figure 5:
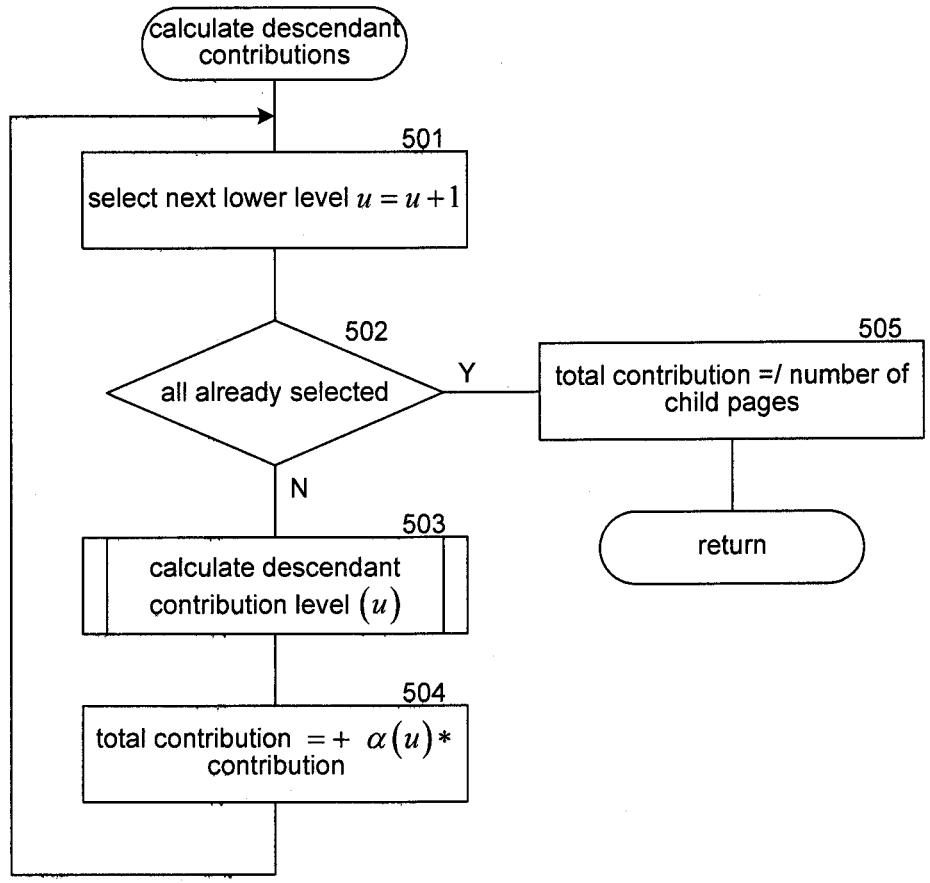
FIG. 5 is a flow diagram that illustrates the processing of the calculate descendant contributions component of the retrieval system in one embodiment.

FIG. 5 is a flow diagram that illustrates the processing of the calculate descendant contributions component of the retrieval system in one embodiment. The component loops selecting each level of the subsite and calculates the contribution of the web pages at that level to the subsite feature. In block 501, the component selects the next lower level of the subsite starting with the level below the root web page. In decision block 502, if all the levels have already been selected, then the component continues at block 505, else the component continues at block 503. In block 503, the component invokes the calculate descendant contributions at level component for the selected level to calculate the contribution of the web pages at the selected level. In block 504, the component adds the contribution of the selected level adjusted by the ancestral distance punishment factor to the total contribution of the descendant web pages at the selected level. The component then loops to block 501 to select the next lower level of the subsite. In block 505, the component normalizes the total contribution by the number of child web pages and then returns.

Figure 6:
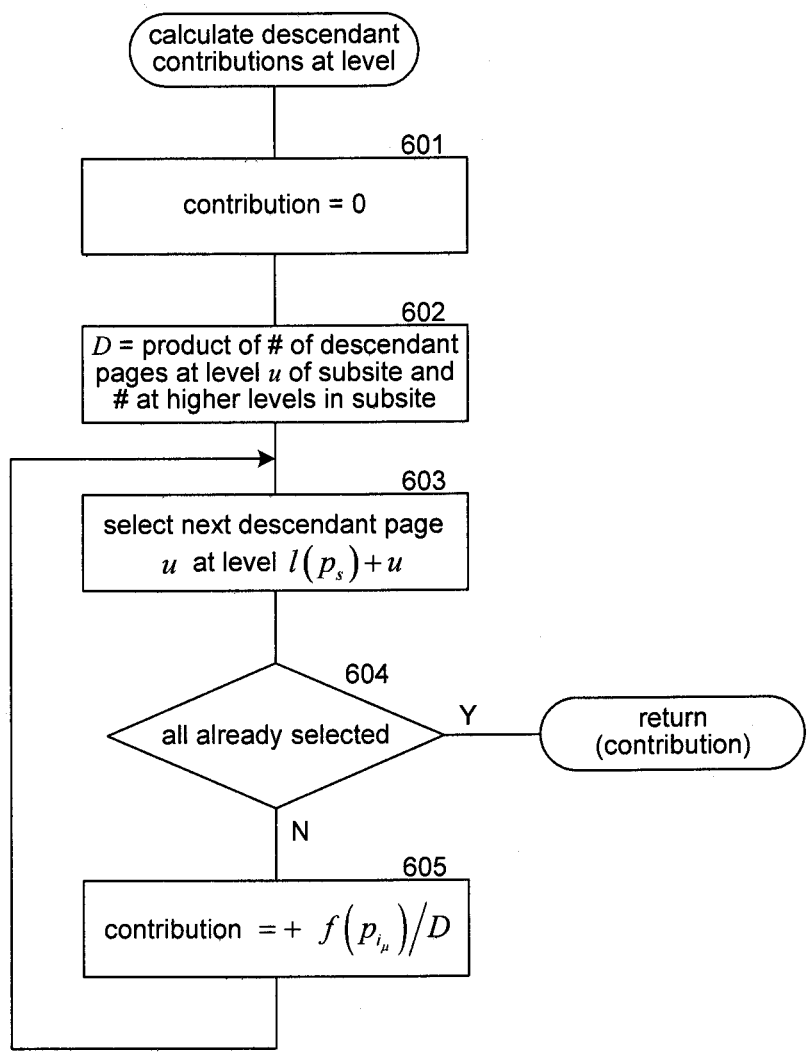
FIG. 6 is a flow diagram that illustrates the processing of the calculate descendant contributions at level component of the retrieval system in one embodiment.

FIG. 6 is a flow diagram that illustrates the processing of the calculate descendant contributions at level component of the retrieval system in one embodiment. The component is passed a level and calculates the contributions of the descendant web pages at that level to the subsite feature. In block 601, the component initializes the contribution of that level. In block 602, the component calculates the denominator of Equation _____, which is the product of the number of descendant web pages at each level from the passed level to the root web page. In blocks 603-605, the component loops accumulating the contribution of each descendant web page at the passed level. In block 603, the component selects the next descendant web page at the passed level. In decision block 604, if all the descendant web pages have already been selected, then the component returns the contribution, else the component continues at block 605. In block 605, the component accumulates the contribution of each descendant web page divided by the denominator and then loops to block 603 to select the next descendant web page.

Figure 7:
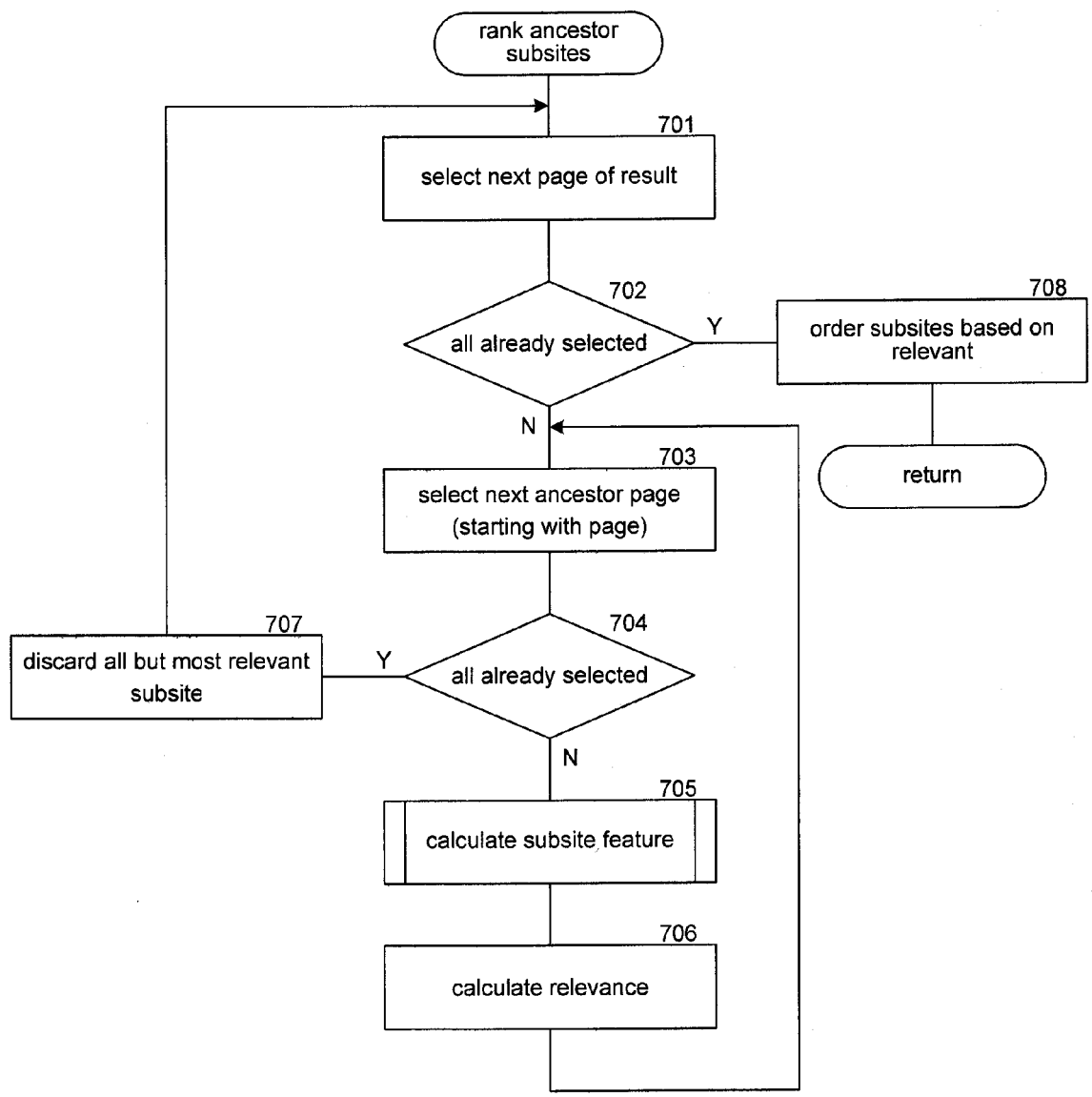
FIG. 7 is a flow diagram that illustrates the processing of the rank ancestor subsites component of the retrieval system in one embodiment.

FIG. 7 is a flow diagram that illustrates the processing of the rank ancestor subsites component of the retrieval system in one embodiment. The component determines the subsite feature for each web page of the result and the subsite feature for each ancestor web page of the result. For each web page of the search result, the component selects the ancestor subsite with the highest relevance and returns the root web pages of those subsites ranked according to their subsite relevance. In block 701, the component selects the next web page of the search result. In decision block 702, if all the web pages have already been selected, then the component continues at block 708, else the component continues at block 703. In blocks 703-706, the component loops selecting each ancestor web page of the selected web page. In block 703, the component selects the next ancestor web page starting with the web page itself. In decision block 704, if all the ancestor web pages have already been selected, then the component continues at block 707, else the component continues at block 705. In block 705, the component invokes the calculate subsite feature component to calculate the subsite feature for the subsite with its root at the selected ancestor web page. In block 706, the component calculates the relevance for the subsite of the selected ancestor web page and then loops to block 703 to select the next ancestor web page. In block 707, the component discards all but the most relevant ancestor subsites for the selected web page and then loops to block 701 to select the next web page of the search result. In block 708, the component orders the subsites that have not been discarded based on relevance and then returns.

Although the subject matter has been described in language specific to structural features and/or methodological acts, it is to be understood that the subject matter defined in the appended claims is not necessarily limited to the specific features or acts described above. For example, the retrieval system may be adapted to use any of a variety of functions to calculate a subsite feature. In addition, the ancestral distance punishment factor and the sibling punishment factor may be represented by a variety of linear and non-linear functions. A search engine may rank search results according to relevance based on the subtree features. The retrieval system may have an offline mode in which subtree features are calculated and stored for future use. Alternatively, the retrieval system may dynamically calculate subtree features for subtrees associated with queries. The retrieval system may store the dynamically generated subtree features so that they do not need to be recalculated for subsequent queries. Accordingly, the invention is not limited except as by the appended claims.

We claim:

1. A computer-readable memory containing instructions for controlling a computing device to identify web pages for a search result for a query, the web pages being organized into web sites, the web pages of a web site being hierarchically organized into ancestor/descendant relationships, each web page of a web site being a root web page of a subsite of the web site, a subsite includes the root web page of the subsite and its descendant web pages, by a method comprising:
 receiving from a user a query;
 identifying web pages that are related to the received query, the identified web pages forming search results for the received query;
 after identifying web pages that are related to the received query,
  for each identified web page,
   calculating a subsite feature for the subsite with the identified web page being the root web page of the subsite based on a contribution from a feature of the identified web page and a contribution from the feature of the descendant web pages of the identified web page, such that the subsite feature is calculated by aggregating the contributions from the feature of the identified web page and from the feature of the descendant web pages and the contribution of the feature of a descendant web page to the aggregating decreases as an ancestral distance between the identified web page and the descendant web page increases; and
  determining relevance of the identified web page to the query based on the calculated subsite feature of the subsite; and
 ranking the identified web pages based on the determined relevance.

2. The computer-readable memory of claim 1 including presenting to the user an indication of the identified web pages in an order that is based at least in part on the determined relevance of the identified web pages.

3. The computer-readable memory of claim 1 wherein the relevance of a subsite indicates how well the subsite represents a topic distillation for the query.

4. The computer-readable memory of claim 1 wherein the contribution of a descendant web page decreases as a number of sibling web pages to the descendant web page increases.

5. The computer-readable memory of claim 4 wherein the contribution is decreased by a factor represented by the following:

$$\alpha(\Delta l) = \lambda^{\Delta l}$$

where $\alpha$ represents the decrease, $\Delta l$ represents ancestral distance between the root web page and a descendant web page, and $\lambda$ represents a parameter to control the amount of decrease.

6. The computer-readable memory of claim 1 wherein the contribution is decreased by a factor represented by the following:

$$\alpha(\Delta l) = \lambda^{\Delta l}$$

where $\alpha$ represents the decrease, $\Delta l$ represents ancestral distance between the root web page and a descendant web page, and $\lambda$ represents a parameter to control the amount of decrease.

7. The computer-readable memory of claim 1 wherein the subsite features are calculated independently of a query and stored for use when identifying search results of queries.

8. The computer-readable memory of claim 1 wherein the subsite features are calculated based on initial search results of a query.

9. The computer-readable memory of claim 8 wherein the web pages of the search result are root web pages of subsites.

10. A computing device for identifying web pages for a search result for a query, the web pages being organized into web sites, the web pages of a web site being hierarchically organized into ancestor/descendant relationships, each web page of a web site being a root web page of a subsite of the web site, a subsite includes the root web page of the subsite and its descendant web pages, the computing device comprising:
   a memory storing computer-executable instructions of:
      a component that receives from a user a query;
      a component that identifies web pages that are related to the received query, the identified web pages forming search results for the received query; and
      a component that, after identifying web pages that are related to the received query,
         for each identified web page,
            calculates a subsite feature for the subsite with the identified web page being the root web page of the subsite based on a contribution from a feature of the identified web page and a contribution from the feature of the descendant web pages of the identified web page, such that the subsite feature is calculated by aggregating the contributions from the feature of the identified web page and from the feature of the descendant web pages and the contribution of the feature of a descendant web page to the aggregating decreases as an ancestral distance between the identified web page and the descendant web page increases; and
            determines relevance of the identified web page to the query based on the calculated subsite feature of the subsite; and
         ranks the identified web pages based on the determined relevance; and
   a processor that executes the computer-executable instructions stored in the memory.

11. The computing device of claim 10 including a component that presents to the user an indication of the identified web pages in an order that is based at least in part on the determined relevance of the identified web pages.

12. The computing device of claim 10 wherein the relevance of a subsite indicates how well the subsite represents a topic distillation for the query.

13. The computing device of claim 10 wherein the contribution of a descendant web page decreases as a number of sibling web pages to the descendant web page increases.

14. The computing device of claim 13 wherein the contribution is decreased by a factor represented by the following:

$$\alpha(\Delta l) = \lambda^{\Delta l}$$

where $\alpha$ represents the decrease, $\Delta l$ represents ancestral distance between the root web page and a descendant web page, and $\lambda$ represents a parameter to control the amount of decrease.

15. The computing device of claim 10 wherein the contribution is decreased by a factor represented by the following:

$$\alpha(\Delta l) = \lambda^{\Delta l}$$

where $\alpha$ represents the decrease, $\Delta l$ represents ancestral distance between the root web page and a descendant web page, and $\lambda$ represents a parameter to control the amount of decrease.

16. The computing device of claim 10 wherein the subsite features are calculated independently of a query and stored for use when identifying search results of queries.

17. The computing device of claim 10 wherein the subsite features are calculated based on initial search results of a query.

18. The computing device of claim 17 wherein the web pages of the search result are root web pages of subsites.

19. A method performed by a computer for controlling a computing device to identify web pages for a search result for a query, the web pages being organized into web sites, the web pages of a web site being hierarchically organized into ancestor/descendant relationships, each web page of a web site being a root web page of a subsite of the web site, a subsite includes the root web page of the subsite and its descendant web pages, the method comprising:
   receiving from a user a query;
   identifying web pages that are related to the received query, the identified web pages forming search results for the received query; and
   after identifying web pages that are related to the received query,
      for each identified web page,
         calculating by the computer a subsite feature for the subsite with the identified web page being the root web page of the subsite based on a contribution from a feature of the identified web page and a contribution from the feature of the descendant web pages of the identified web page, such that the subsite feature is calculated by aggregating the contributions from the feature of the identified web page and from the feature of the descendant web pages and the contribution of the feature of a descendant web page to the aggregating decreases as an ancestral distance between the identified web page and the descendant web page increases; and
         determining by the computer relevance of the identified web page to the query based on the calculated subsite feature of the subsite; and
      ranking by the computer the identified web pages based on the determined relevance.

20. The method of claim 19 wherein the relevance of a subsite indicates how well the subsite represents a topic distillation for the query.

* * * * *